S. E. McCORMICK.
BLUE GRASS SEED HARVESTER.
APPLICATION FILED OCT. 5, 1912.
1,063,812.
Patented June 3, 1913.
4 SHEETS—SHEET 4.
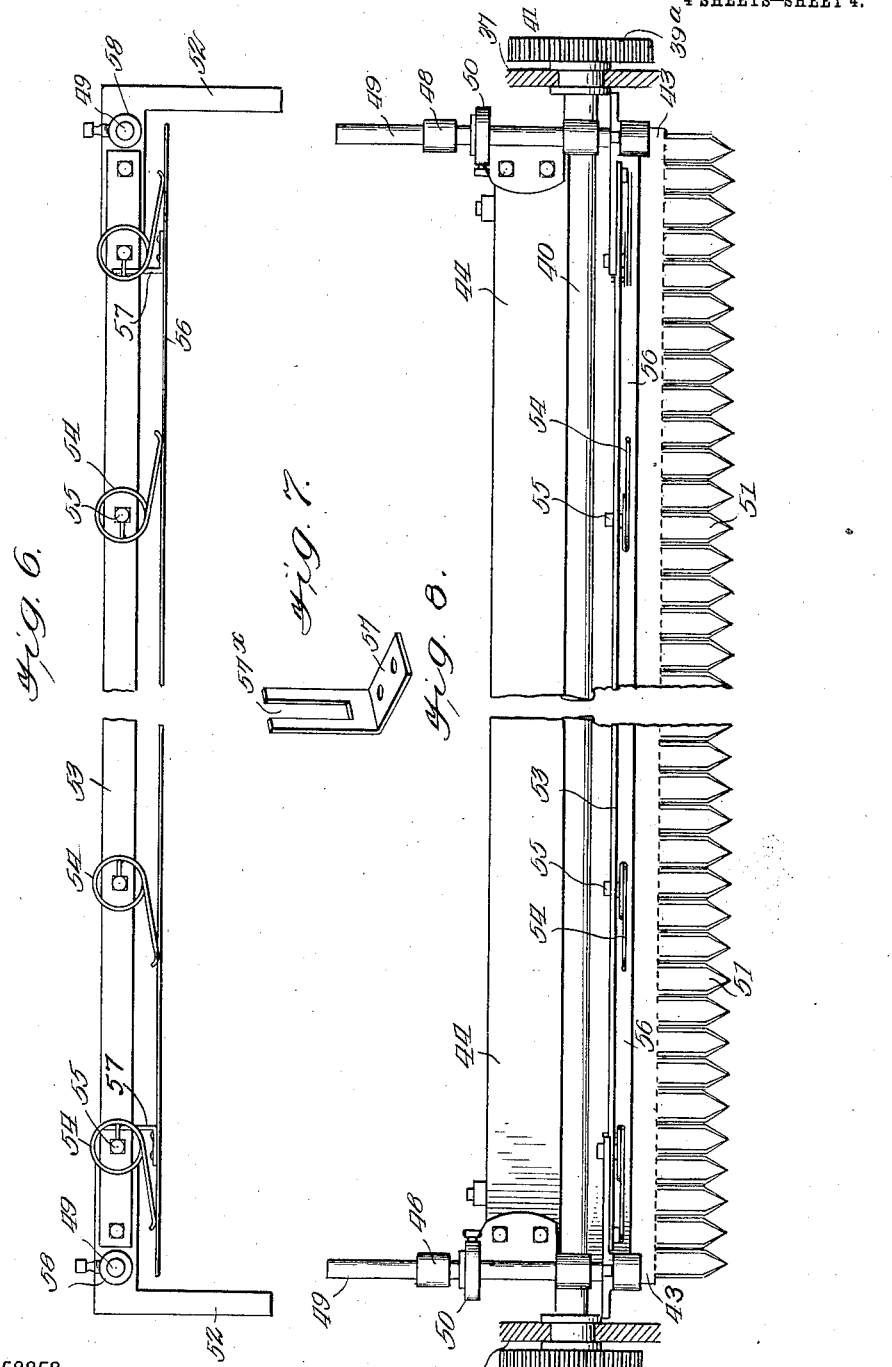
WITNESSES
INVENTOR
Samuel E. McCormick
BY
ATTORNEYS

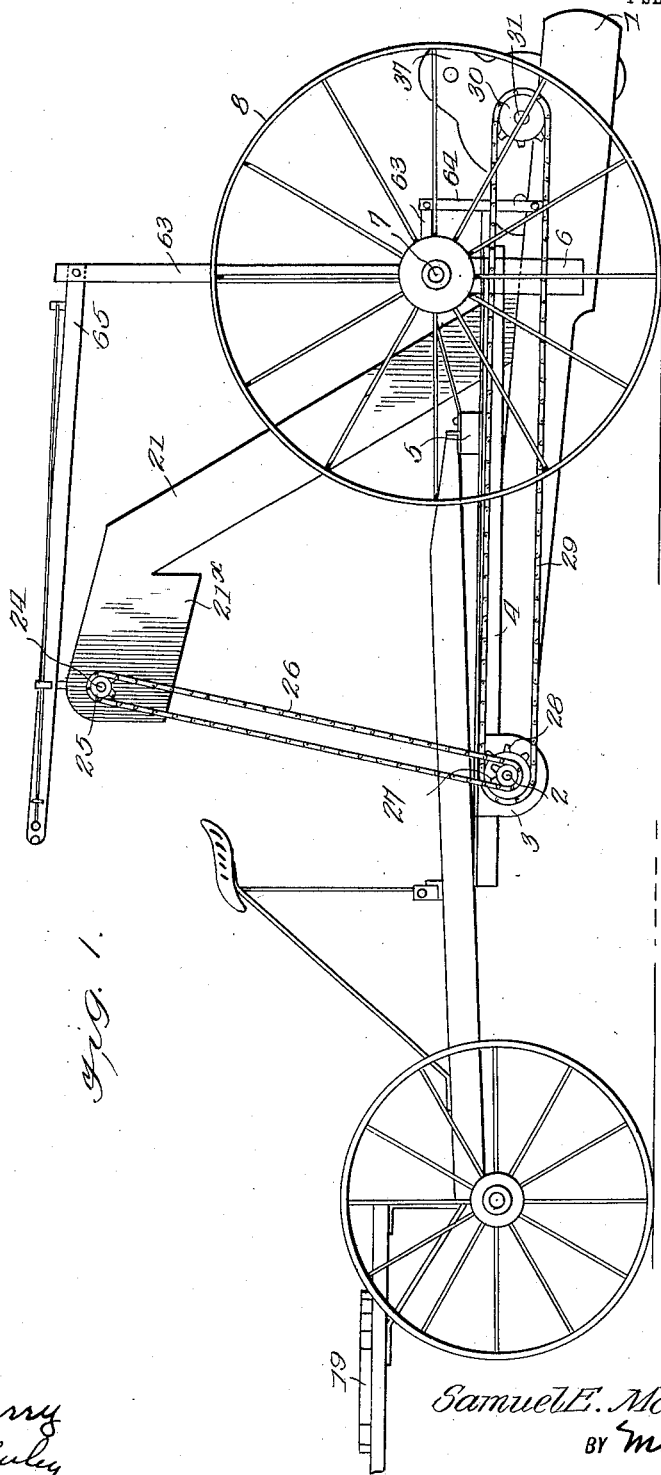

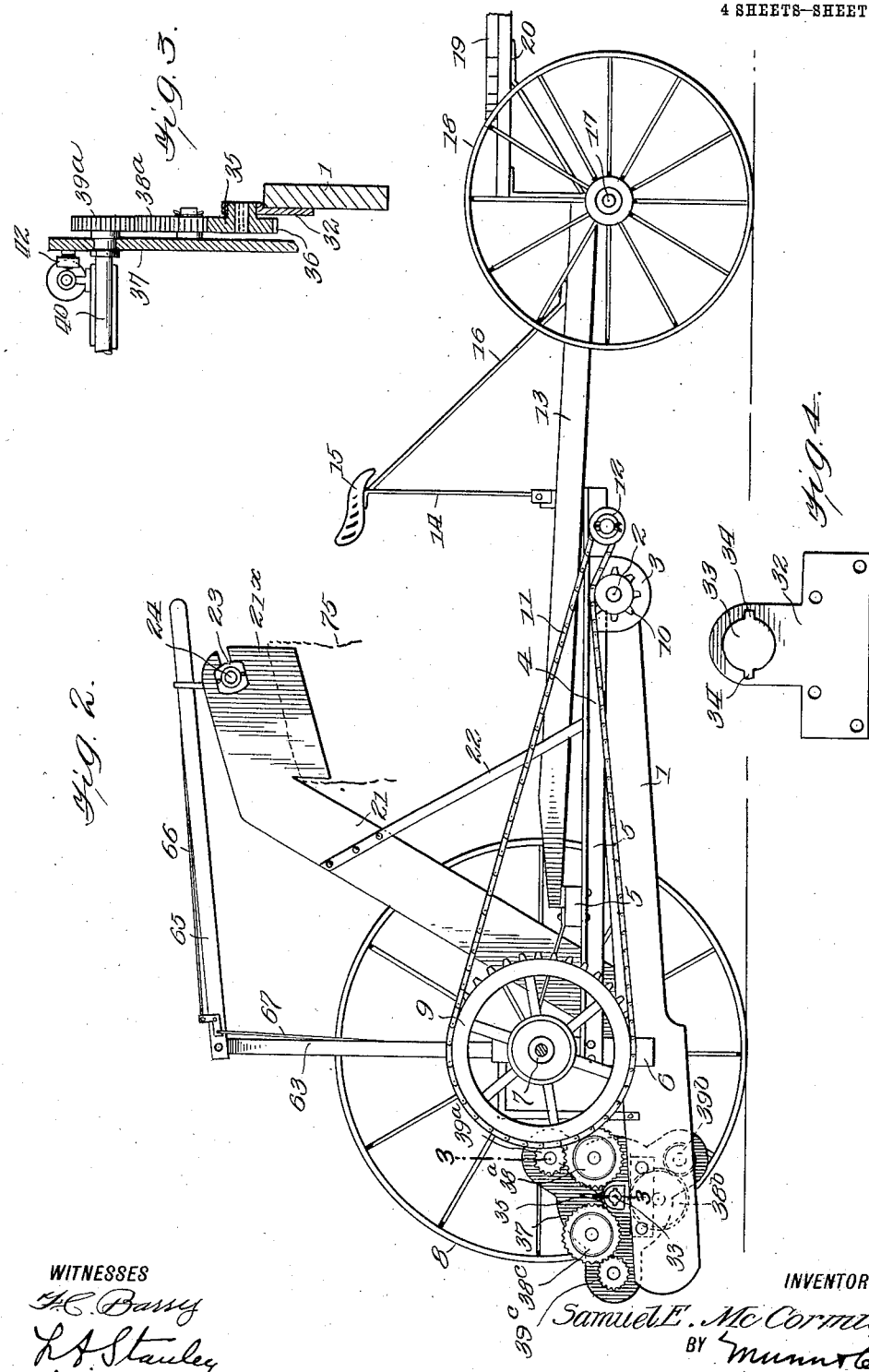

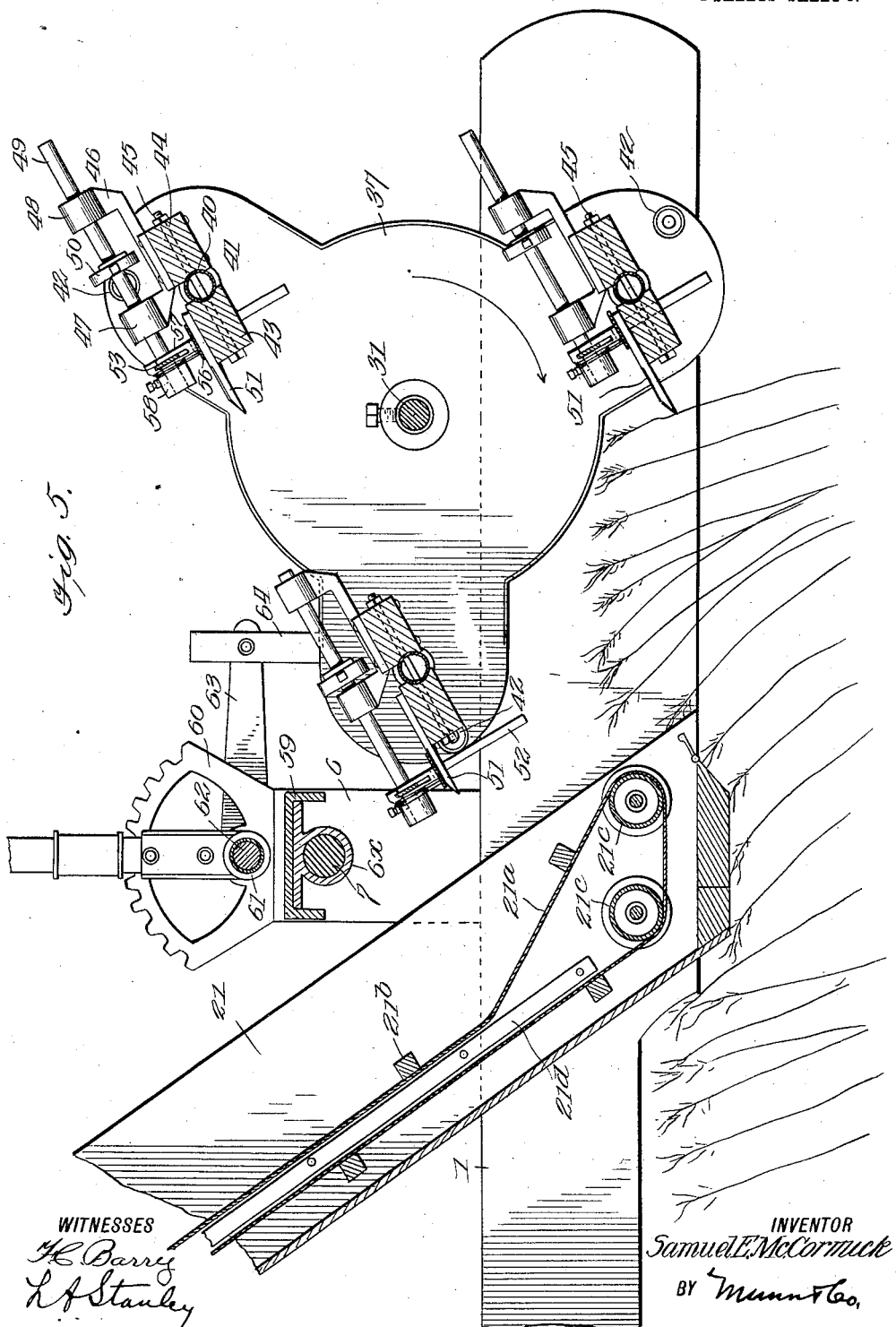

UNITED STATES PATENT OFFICE.

SAMUEL E. McCORMICK, OF WINCHESTER, KENTUCKY.

BLUE-GRASS-SEED HARVESTER.

1,063,812.   Specification of Letters Patent.   Patented June 3, 1913.

Application filed October 5, 1912. Serial No. 724,052.

*To all whom it may concern:*

Be it known that I, SAMUEL E. MCCORMICK, a citizen of the United States, and a resident of Winchester, in the county of Clark and State of Kentucky, have invented certain new and useful Improvements in Blue-Grass-Seed Harvesters, of which the following is a specification.

My invention relates to improvements in grass seed harvesters, especially those devices which are designed to strip blue grass seed and to collect it, and it consists in the combinations, constructions and arrangements herein described and claimed.

An object of my invention is to provide a device by means of which blue grass seed may be stripped from the stem and collected in sacks or other receptacles at a maximum rate and with very small loss of seed.

A further object of my invention is to provide a device which will effectively strip the seed from grasses of different lengths.

A further object of my invention is to provide a device having combs for stripping the seed and means for automatically cleaning the combs thereby preventing clogging of the machine.

A further object of my invention is to provide a device in which the stripping means is fully protected from breakage.

Other objects and advantages will appear in the following specification and the novel features of the invention will be particularly pointed out in the appended claims.

My invention is illustrated in the accompanying drawings forming part of this application in which similar reference characters indicate like parts in the several views and in which—

Figure 1 is a side view of the device; Fig. 2 is a view of the opposite side of the device from that shown in Fig. 1; Fig. 3 is a section along the line 3—3 of Fig. 2; Fig. 4 is a face view of a casting for supporting one of the bearings; Fig. 5 is an enlarged sectional detail view through a portion of the mechanism showing the stripping mechanism and elevator; Fig. 6 is a face view of a portion of the stripping mechanism; Fig. 7 is a perspective view of a supporting member; and, Fig. 8 is a plan view of a portion of the stripping mechanism.

In carrying out my invention I provide a frame having side members 1 between the forward ends of which is journaled a shaft 2. In order to provide bearings for the shaft 2 I make use of plates 3 which are secured to a frame having side members 4, the latter being joined together by means of a cross piece 5. At the rear ends of the side members 4 are secured vertical supports 6, at the top of which is journaled a shaft 7. The supports 6 extend downwardly beyond the side members 1 and form guides for these side members.

Journaled on the shaft 7 are the drive wheels 8. The shaft 7 also bears a sprocket wheel 9 which drives the sprocket 10 on the shaft 2 by means of a chain 11. At 12 I have shown a tightener for the chain. Secured to the cross piece 5 and to the frame 2 is a reach pole 13 upon which is mounted a support 14 for a seat 15. The latter is braced by means of a rod 16. At the forward end of the reach pole 13 is the axle 17 of the wheels 18. A shaft 19 is secured to the truck by means of the risers 20.

At 21 I have shown an elevator which is secured at its lower end to the body portion 1 and which is provided with a brace 22. The upper end of the elevator is provided with a downwardly extending spout 21$^x$. The elevator is provided with bearings 23 for a shaft 24. The shaft 24 is provided with a sprocket 25 (see Fig. 1) which is connected by means of a sprocket chain 26 with a sprocket 27 on the shaft 2. The latter also bears a sprocket 28 which is connected by means of a sprocket chain 29 with a sprocket 30 on a shaft 31. The elevator 21 has an endless flexible belt 21$^a$ (see Fig. 5) upon which is mounted cross strips 21$^b$. Idlers 21$^c$ are provided for guiding the belt and a partition 21$^d$ is also provided for spacing the oppositely moving sections of the belt apart.

As will be understood from Fig. 3, the side members 1 are provided with plates, such as that shown at 32 (see Fig. 4). The plate has a central opening 33 with side slots 34 extending therefrom. The hub 35 of a stationary gear 36 projects through the opening 33 and is provided with lugs arranged to enter the slots 34 so as to hold the gear in position. In Fig. 3 is also shown one of the revolving stripping heads 37. These heads are each provided with three intermediate gears, such as those shown at 38ª, 38ᵇ and 38ᶜ in Fig. 2. These intermediate gears are designed to engage the gears 39ª, 39ᵇ and 39ᶜ respectively. The gears 38ª and 39ª are designed to operate the comb mechanism as hereinafter described. There are three of these mechanisms, but a description of one will suffice, since they are all alike. Referring then to Fig. 3 it will be seen that the gear 39ª is on the end of a tube 40 which is journaled in bearings 41 carried by the head 37. A roller 42 is also carried by the head. The tube 40 is disposed between two longitudinal strips 43 and 44 respectively (see Figs 5 and 8). The bolts 45 pass through the members 44, 40 and 43, thus securely binding these parts together. The strip 44 is provided with brackets 46 upon which are bearings 47 and 48 having a slidable rod 49. The latter is provided with a stop collar 50. Secured to the upper portion of the strip 43 is a series of teeth 51.

Referring now to Fig. 6 I have shown therein L-shaped castings 52 to which is secured a bar 53, the latter bearing springs 54 which are secured to the bar by means of bolts 55. These springs normally press upon a scraper plate 56 to which are secured slotted guide lugs like that shown at 57 in Fig. 7, the slots 57ˣ of the guide lugs being arranged to straddle the bar 53 so as to guide the plate 56 in its movement. The plate 56 rests on the top of the teeth 51. The shafts 49 pass through the castings 52 and are provided with collars 58 for securing the castings to the shafts 49. The ends of the castings 52 pass downwardly in the space between the heads 37 and the strip 43 which holds the teeth 51, as shown in Fig. 8.

Referring now to Fig. 5 it will be seen that the upwardly extending members 6 are provided with the bearing member 6ˣ arranged to receive the shaft 7. This bearing member is arranged to enter and be secured to a channel iron 59. The latter bears a locking segment 60 having bearings 61 for the pivot 62 of the bell crank lever 63, one end of which is pivotally connected by a link 64 to the side 1. The long arm of this bell crank lever is connected to a handle or operating rod 65 which is provided with the pull rods 66 and 67 for releasing the locking mechanism from the locking segment 60.

From the foregoing description of the various parts of the device the operation thereof may be readily understood. The device is drawn along by means of a draft animal attached to the shafts 19. The frame 1 carrying the stripper heads 37 may be raised or lowered by means of the handle 65, the frame swinging about the shaft 2. As the device is drawn along power is supplied by means of the sprocket chain 11 and sprocket 10 to the shaft 2. The rotation of the shaft 31 which bears the stripping heads 37 is effected by means of the sprocket 28, sprocket chain 29 and sprocket 30 (see Fig. 1). The rotation of the stripping heads 37 will be in the direction shown by the curved arrow in Fig. 5. The gear 35 it will be remembered is held stationary (see Fig. 2) and the gears 39ª, 39ᵇ and 39ᶜ will be caused to revolve in such a manner as to keep the teeth 51 pointed in an inclined direction, as shown in Fig. 5, no matter what position the members 43 which bear the teeth may occupy.

As the teeth come in contact with the grass the stalk of the grass will enter between the teeth and the seeds will, therefore, be stripped by the teeth from the head of the stalk upon the comb which is composed of the teeth as assembled. As the stripper head revolves further the roller 42 comes in contact with the downwardly projecting portion of the angular casting 52 thus forcing the latter forwardly. The rod 49 slides in its bearing 48 and 47 and the scraper plate 56 which is carried by the bar 53 scrapes the seeds off from the comb upon the elevator. The springs 54 keep the scraper in close contact with the upper side of the comb so that the comb is completely cleared of the seeds. During the further revolution of the stripping mechanism the roller 42 will come into contact with the collar 50 and will thus retract the scraping mechanism. In Fig. 5 I have shown three positions of the stripping mechanism. The lower mechanism is just about to engage the grass for stripping the seeds therefrom. The intermediate mechanism shows the scraper as it has been pushed forwardly to scrape the seeds from the comb, while the upper mechanism shows the roller 42 in the act of engaging the collar 50 to retract the scraper. The elevator lifts the seeds and deposits them in a sack 75 or any other similar receptacle which may be carried on the device.

I desire to call particular attention to certain features which add to the efficiency of the machine. It will be noted that the stripping devices are placed behind the elevator. This protects the stripping head from striking obstructions and therefore the device is not easily gotten out of order.

Blue grass grows very unevenly, that is to say some of the stalks are long while others are short. When the machine is drawn forwardly the lower part of the elevator bends the grass downwardly. As the grass clears the elevator the shorter grass will rise more quickly than the longer grass. It will therefore be caught sooner by the teeth than the longer grass, but the most important fact is that the teeth will catch the grass approximately at the same distance from the head whether the grass be long or short. For this reason it will act evenly on the uneven grass, whereas if it did not do this and should catch the taller grass down lower it might pull up the grass or cut it off without stripping the seed.

I claim:—

1. In a device for stripping grass seed, a main frame, rotatable stripper heads carried thereby, a plurality of frames carried by said stripper heads and rotatable with respect thereto, a comb carried by each of said frames, and means for maintaining all of the frames parallel with a fixed plane.

2. In a device for stripping grass seed, a main frame, rotatable stripper heads carried thereby, a plurality of frames carried by said stripper heads and rotatable with respect thereto, a comb carried by each of said frames, means for maintaining all of the frames parallel with a fixed plane, and means carried by each frame for scraping the seed off from the comb.

3. In a device for stripping grass seed, a main frame, rotatable stripper heads carried thereby, a plurality of frames carried by said stripper heads and rotatable with respect thereto, a stripping comb carried on the upper part of each of said frames, means for maintaining the planes of said frames parallel with each other, and means carried by each frame and slidable with respect to the comb for scraping seed off from the comb.

4. In a device for stripping grass seed, a main frame, rotatable stripper heads carried thereby, a plurality of frames carried by said stripper heads and rotatable with respect thereto, a stripping comb carried on the upper part of each of said frames, means for maintaining the planes of said frames parallel with each other, means carried by each frame and slidable with respect to the comb for scraping seed off from the comb, said scraping means comprising a spring pressed plate arranged to engage the upper surface of the comb, and means for reciprocating the plate.

5. In a device for stripping grass seed, a main frame, rotatable stripper heads carried thereby, a plurality of frames carried by said stripper heads and rotatable with respect thereto, a stripping comb carried on the upper part of each of said frames, means for maintaining the planes of said frames parallel with each other, means carried by each frame and slidable with respect to the comb for scraping seed off from the comb, said scraping means comprising a spring pressed plate arranged to engage the upper surface of the comb, a bracket carried by said plate, a slidable shaft in said bracket, a bar carried by said shaft, and guide means secured to said plate and arranged to slide on said bar.

6. In a device for stripping grass seed, a main frame, rotatable stripper heads carried thereby, a plurality of frames carried by said stripper heads and rotatable with respect thereto, a stripping comb carried on the upper part of each of said frames, means for maintaining the planes of said frames parallel with each other, means carried by each frame and slidable with respect to the comb for scraping seed off from the comb, said scraping means comprising a spring pressed plate arranged to engage the upper surface of the comb, a bracket carried by said plate, a slidable shaft in said bracket, a bar carried by said shaft, a guide means secured to said plate and arranged to slide on said bar, a downwardly extending portion at the end of the bar, and a roller carried by said stripping head and arranged to engage the downwardly extending portion during each revolution of said stripping head.

7. In a device for stripping grass seed, a main frame, rotatable stripper heads carried thereby, a plurality of frames carried by said stripper heads and rotatable with respect thereto, a stripping comb carried on the upper part of each of said frames, means for maintaining the planes of said frames parallel with each other, means carried by each frame and slidable with respect to the comb for scraping seed off from the comb, said scraping means comprising a spring pressed plate arranged to engage the upper surface of the comb, a bracket carried by said plate, a slidable shaft in said bracket, a bar carried by said shaft, a guide means secured to said plate and arranged to slide on said bar, a downwardly extending portion at the end of the bar, and a roller carried by said stripping head and arranged to engage the downwardly extending portion during each revolution of said stripping head, and a collar carried by said shaft and arranged to be engaged by said roller for moving the said shaft to retract said scraper.

8. In a machine for stripping grass seed, a truck, wheels carried thereby, a frame pivotally mounted on said truck, means for elevating and lowering said frame, a pair of revolving stripper heads, a series of frames carried by said revolving stripper head and having a rotary movement with respect to said heads, a comb carried by each of said stripper heads and arranged to be brought into engagement with the grass during the rotation of the heads, and means for maintaining the planes of the combs parallel with one another during their revolution.

9. In a machine for stripping grass seed, a truck, wheels carried thereby, a frame pivotally mounted on said truck, means for elevating and lowering said frame, a pair of revolving stripper heads, a series of frames carried by said revolving stripper head and having a rotary movement with respect to said heads, a comb carried by each of said stripper heads and arranged to be brought into engagement with the grass during the rotation of the heads, means for maintaining the planes of the combs parallel with one another during their revolution, an elevator for conveying upwardly the seeds stripped by the combs, and a receptacle at the end of the elevator for receiving the seeds.

SAMUEL E. McCORMICK.

Witnesses:
 PERMITT L. HARRIS,
 LINVILLE JACKSON.

Copies of this patent may be obtained for five cents each, by addressing the "Commissioner of Patents, Washington, D. C."